Aug. 11, 1942.	G. A. CHARLSTON	2,292,430
GUARD FOR GLASS COFFEE MAKERS
Filed Oct. 22, 1941
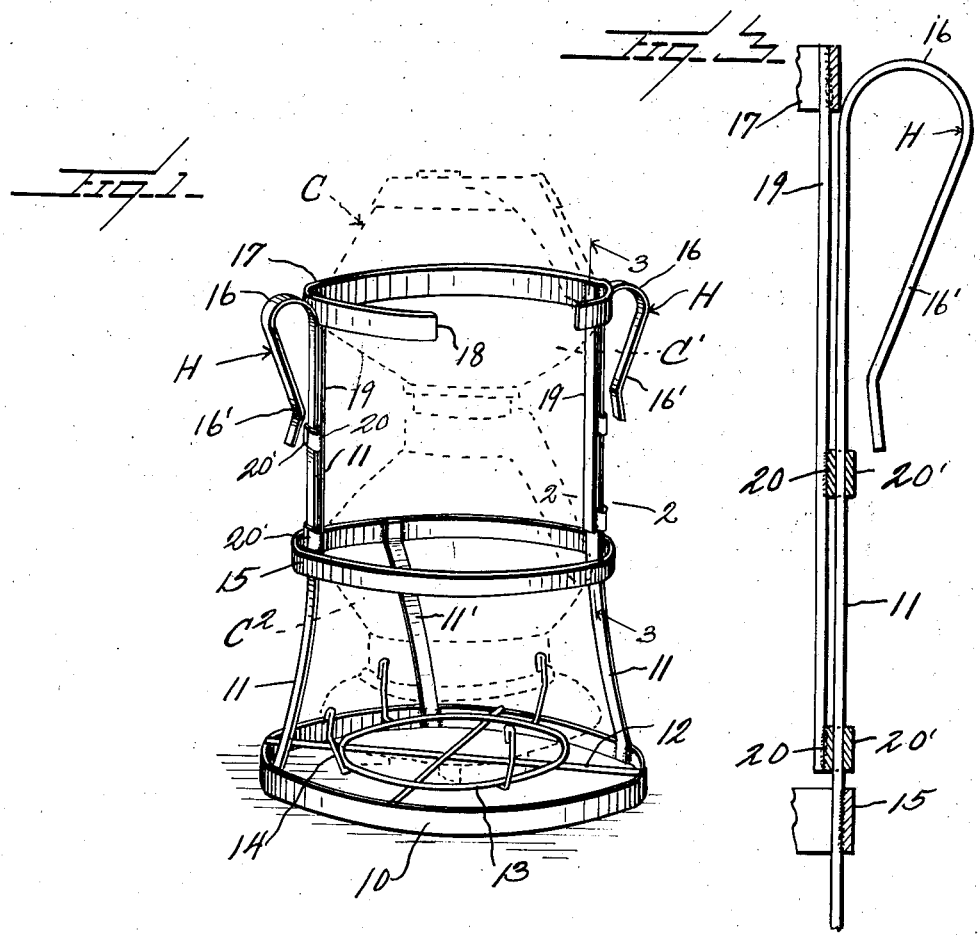
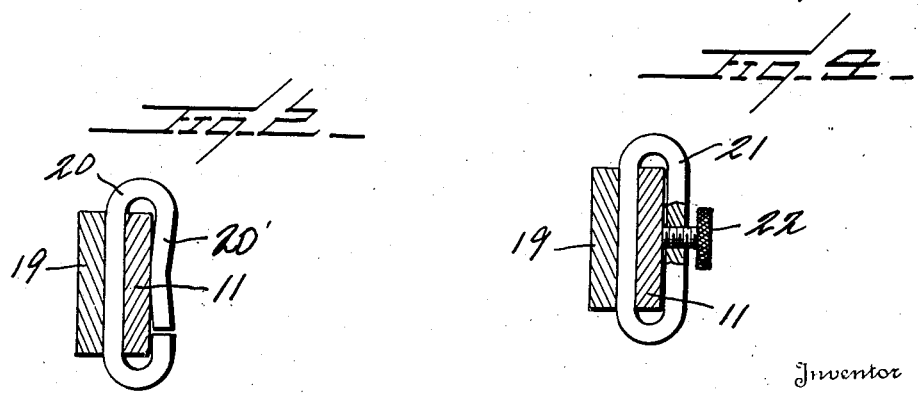
Inventor
Gustave A. Charlston
By Watson E. Coleman
Attorney Patented Aug. 11, 1942

2,292,430

UNITED STATES PATENT OFFICE 2,292,430

GUARD FOR GLASS COFFEE MAKERS

Gustave A. Charlston, Portland, Oreg.

Application October 22, 1941, Serial No. 416,120

8 Claims. (Cl. 53—3)

This invention relates generally to devices for use in connection with glass coffee makers, for the purpose of protecting or guarding the same.

The primary object of the present invention is to provide a guard or protecting device for glass coffee makers which practically encloses the coffee maker and particularly guards or protects the upper and lower bowls of the device from being struck, and a particular feature of the present invention resides in the provision of such a device in which the upper portion can be raised or lowered to adapt the device to coffee makers of different heights.

Another object of the invention is to provide a glass coffee maker protecting device or guard which comprises vertically spaced guard rings connected to a common supporting structure so that the lower guard ring will encircle the lower glass globe of the coffee maker and the upper ring will encircle the upper glass globe thereof, the upper ring being adjustably coupled with the lower ring to be raised or lowered as may be desired so that it may be properly positioned around the widest portion of the upper glass globe.

Another object of the invention is to provide in a device of the above described character, a novel means for adjustably connecting the upper ring with the supporting uprights to which the lower ring is attached, whereby the upper ring can be easily and quickly moved up or down as desired and firmly secured against accidental movement after it has been placed in adjusted position.

Another object of the invention is to provide in a coffee guard of the character stated, a novel construction of handling or lifting means forming an integral part of uprights of the device whereby the entire guard device can be readily lifted to be moved about as desired.

The invention will be best understood from a consideration of the following detailed description taken in connection with the accompanying drawing forming part of this specification, with the understanding, however, that the invention is not to be confined to any strict conformity with the showing of the drawing but may be changed or modified so long as such changes or modifications mark no material departure from the salient features of the invention as expressed in the appended claims.

In the drawing:

Figure 1 is a view in perspective of the improved coffee maker protector or guard embodying the present invention.

Figure 2 is a horizontal section taken substantially on a line 2—2 of Figure 1.

Figure 3 is a vertical section taken substantially on a line 3—3 of Figure 1.

Figure 4 is a horizontal section corresponding to Figure 2 but showing a modified means of securing the upper adjustable ring supporting bars to the ring carrying standards.

Referring now more particularly to the drawing there is shown in Figure 1 in dotted outline a glass coffee maker which is indicated generally by the character C, which comprises the usual upper and lower globes or glass receptacles C¹ and C². The device embodying the present invention is designed to enclose this coffee maker so as to protect the same against breakage.

The present device comprises an annular base portion 10 to which are secured at diametrically opposite points the upwardly extending standards 11 which are of a height to extend through the major portion of the height of the coffee maker. The base is of sufficient size to space the standards apart the proper distance to permit the coffee maker to be placed in between the standards and in order to support the coffee maker the base has secured thereto a frame structure upon which the heating unit of the coffee maker is mounted. This frame structure may be of any suitable design but is here shown as comprising the crossed bars 12 which are secured at their ends to the base and which support a ring 13 upon which the base of the coffee maker is placed. This ring 13 has integrally secured thereto a number of upright folding fingers 14 which are formed of a bendable material so that when the heating unit forming the base of the coffee maker is placed upon the supporting ring within the circular area defined by the fingers 14, the fingers may be bent inwardly over the edge of the heater base to securely hold the same in position. This particular feature is set forth and claimed in my co-pending application Ser. No. 355,836.

Encircling the standard 11 and secured thereto at a substantial height above the annular base 10, is a lower guard ring 15 which is arranged so that it will encircle the widest part of the lower globe B² to effectively protect or shield the same from damage. This guard ring 15 is of slightly smaller diameter than the base 10 and it will be seen that in order to properly connect the guard ring with the standards, the latter are curved inwardly slightly from the base to the guard ring 15 and then extend straight upwardly from the ring 15.

The upper end portions of the standards 11 are bent outwardly and downwardly in a relatively wide arc 16. This arcuate portion 16 merges into the straight portion 16' which extends downwardly and inwardly toward the adjacent standard 11 so as to form a handle H.

At the rear of the guard there is provided the short standard 11' which is curved and extends upwardly from the base 10 to the lower guard ring 15 where it terminates.

Disposed above the guard ring 15 is an upper guard ring 17 which is of incomplete circular form so that there is provided the opening 18 which is located at the front side of the guard, that is, at the side opposite from the short standard 11'.

The upper guard ring 17 has integrally connected thereto the upper ends of the pair of legs 19 each of which is disposed upon the inner side of the upper portion of a standard 11.

Each of the legs 19 have secured thereto a pair or more of split loops 20, each of which encloses or encircles the adjacent standard. As shown in Figure 2 these split loops each has an outer portion 20' which is adapted to be bent inwardly to frictionally engage the adjacent side of the standard 11 and thereby hold the leg to which the loop is attached against accidental movement with respect to the standard. The material of these loops will, of course, be of bendable or deformable character so that when it is pressed in against the adjacent standard it will stay in that position and maintain frictional contact therewith and thus the upper guard ring 17 will maintain the position in which it is set.

The upper guard ring will be adjusted as to its height or position above the lower ring 15 so as to encircle the upper globe C¹ at its widest part as shown in Figure 1. In this manner effective protection will be given to the globe and it will be readily apparent that with this construction of coffee maker guard coffee makers of different heights can be used in the guard, it being merely necessary to raise or lower the upper guard ring in order to bring it into the proper position with respect to the upper globe of the coffee maker. It will of course be understood that by having the upper guard ring 17 split or open the coffee maker can be lifted out of the protector since the narrow portion between the two globes can readily pass through the opening 18 after the coffee maker has been lifted to the proper height.

Figure 4 illustrates a modified means of adjustably securing the upper guard ring upon the supporting standards. In this form of the invention the loops which are carried by the legs of the upper ring and which encircle the upper portions of the standard 11 are indicated by the numeral 21. The loop here shown is of complete form instead of being broken like the loop 20 and the outer part of loop 21 carries a binding screw 22 which is provided with a knurled head so that it may be readily loosened or tightened up with the fingers to frictionally engage or to release the adjacent standard which the loop encircles. By this construction the upper ring may be securely locked against movement so long as the screws remain tightly in engagement with the standards.

From the foregoing it will be readily apparent that there has been provided in the present device an effective means of shielding or guarding glass coffee makers, which guarding means may be easily and quickly adjusted to suit coffee makers of different heights as the occasion may require.

What is claimed is:

1. A safety guard for coffee makers of the character stated, comprising a frame structure formed to have a coffee maker positioned therein, said structure including a pair of upright standards between which the coffee maker is positioned, a circular element forming the upper part of the frame, and connecting means between the circular element and said standards facilitating the raising and lowering of said element and securing the same in raised or lowered position with respect to a part of the coffee maker.

2. A safety guard for a coffee maker of the character described, comprising a base, a pair of standards secured to the base and extending a substantial distance upwardly therefrom, an annular guard ring secured to the standards and supported thereby above the base, the annulus guard ring being designed to receive said coffee maker between the standards, an upper open guard ring, and means forming a sliding connection between the upper guard ring and the standards facilitating the vertical adjustment of the upper guard ring with respect to the first mentioned ring.

3. A safety guard for coffee makers, as set forth in claim 2, with handles secured to the upper ends of said standards adjacent said upper guard ring, by which said safety guard may be lifted.

4. A safety guard for coffee makers, as set forth in claim 2 including a handle forming an integral continuation of the upper portion of each of said standards to provide an outwardly and downwardly turned element adapted to be grasped in the hand to facilitate lifting the guard.

5. A safety guard for glass coffee makers of the character stated, comprising a base, a pair of standards extending upwardly from said base and spaced apart a sufficient distance to have the coffee maker disposed therebetween, said coffee maker being supported on the base, a guard ring encircling said standards and disposed concentrically with the base, said guard ring being located at an elevation to encircle the widest portion of the lower globe of the coffee maker, an upper split guard ring adapted to encircle the upper globe of the coffee maker, a pair of legs connected with said upper guard ring and disposed parallel with the upper ends of the standards, and a connecting means between said legs and the adjacent standards facilitating vertically shifting the upper guard ring and securing the same in a vertically adjusted position.

6. A safety guard as set forth in claim 5 in which the upper ends of the standards are continued outwardly and downwardly to form lifting handles.

7. A safety guard as described in claim 5, in which said means for adjustably securing the legs to the standards comprises split loops carried by the legs and encircling the standards and adapted to be bent into frictional engagement with the standards to frictionally maintain the legs and upper guard ring in vertically adjusted position.

8. A safety guard as set forth in claim 5 in which the said means for maintaining said legs and upper guard ring in vertically adjusted position comprises loop members carried by the legs and encircling the adjacent standards, and a binding screw carried by certain of the loops for frictional engagement with the adjacent legs.

GUSTAVE A. CHARLSTON.